Figure 1:
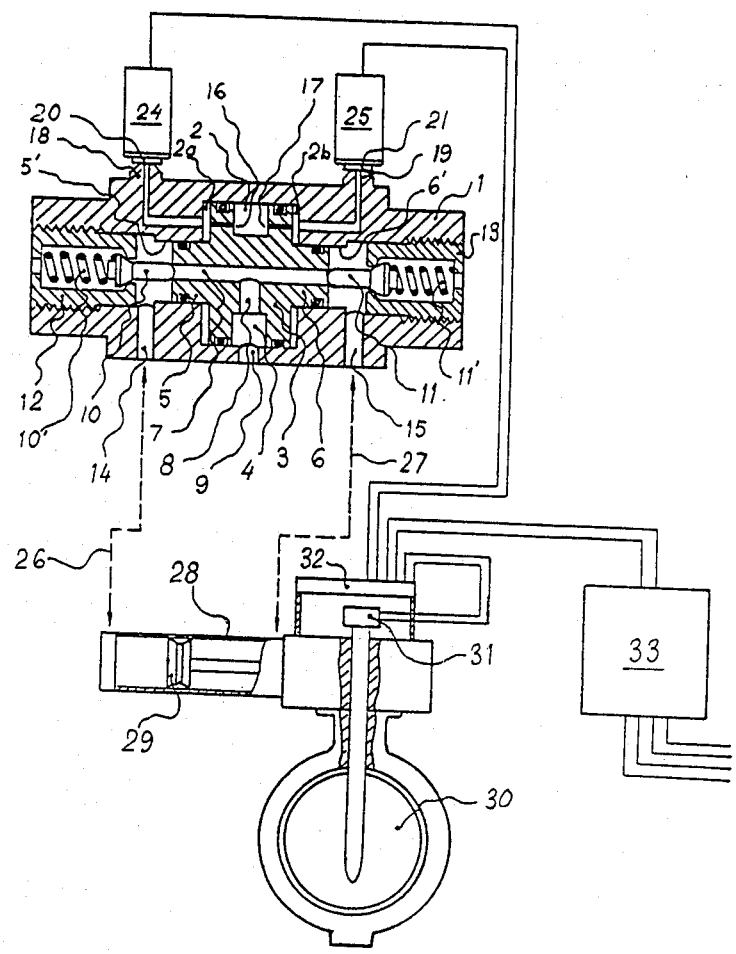

United States Patent [19]

Aspervall et al.

[11] Patent Number: 4,669,358
[45] Date of Patent: Jun. 2, 1987

[54] PNEUMATIC SERVO VALVE (GOVERNING VALVE)

[75] Inventors: Roland Aspervall; Bo Jareke, both of Säffle, Sweden

[73] Assignees: Computer Instrument AB; Aspervall Instrument AB, both of Sweden

[21] Appl. No.: 777,778

[22] PCT Filed: Feb. 6, 1985

[86] PCT No.: PCT/SE85/00057
§ 371 Date: Sep. 16, 1985
§ 102(e) Date: Sep. 16, 1985

[87] PCT Pub. No.: WO85/03556
PCT Pub. Date: Aug. 15, 1985

[30] Foreign Application Priority Data

Feb. 9, 1984 [SE] Sweden ............................... 8400676

[51] Int. Cl.$^4$ ............................................. F15B 13/02
[52] U.S. Cl. .......................................... 91/51; 91/461; 91/464; 91/465; 137/596.16
[58] Field of Search .................. 91/459, 51, 461, 464, 91/465; 137/625.61, 596.16

[56] References Cited

U.S. PATENT DOCUMENTS

| | | | |
|---|---|---|---|
| 2,729,242 | 1/1956 | Olson | 91/51 X |
| 2,924,200 | 2/1960 | Hanna et al. | 91/51 X |
| 3,318,332 | 5/1967 | Lansky et al. | 91/51 X |
| 4,513,782 | 4/1985 | Contartese et al. | 91/361 |

FOREIGN PATENT DOCUMENTS

| | | | |
|---|---|---|---|
| 1245665 | 7/1967 | Fed. Rep. of Germany | 137/596.16 |
| 3041339 | 6/1982 | Fed. Rep. of Germany | 137/625.61 |

Primary Examiner—Carlton R. Croyle
Assistant Examiner—Paul F. Neils
Attorney, Agent, or Firm—Wegner & Bretschneider

[57] ABSTRACT

A pneumatic servo valve comprising a piston in a cylinder. Both controlling surfaces of the piston are exposed to controlling air. The piston is provided with an axial drilling extending through it, which communicates via a radial groove with an inlet of controlling air. Both openings of the drilling are normally closed by spring actuated mushroom valves. Controlling chambers in the cylinder communicate through calibrated conduits in the piston with the radial groove, and can be put into communication with the surrounding atmosphere via outlets. The outlets are controlled by electromagnet valves. A microcomputer receives signals from correct and actual value indicators respectively, and administers opening and closing of the valves. When one of these is opened the connected controlling chamber is decompressed and the piston moves in the direction of the empty chamber. One of the mushroom valves follows the movement of the piston, while the other mushroom valve is prevented from moving by a valve seat. The adjacent opening of the drilling is exposed, so that controlling air can pass through a connection, effecting the desired controlling action.

9 Claims, 4 Drawing Figures

PNEUMATIC SERVO VALVE (GOVERNING VALVE)

Shifting means, e.g. servo motors, are often used for manipulation of heavy devices within the industry and other technical fields, such as heating plants, water treatment plants, lifting equipment and so on. The manipulation work is affected by means of a pressure fluid, or pressure gas, which acts e.g. on a piston axially slideable within a cylinder, or on a rotatably mounted wing.

The governing of the pressure medium to and from the cylinder is affected by means of a governing valve or, as it is often called a pilot valve, or servo valve. In lifting or escavating machines for instance the controlling motion of such valves is made manually, but may alternatively also be governed by a signal impulse to an internal servo system within the valve, so to say servo on servo.

The most common type of servo valve is the well known, so called sliding piston, comprising a cylinder with radial ports and corresponding piston portions arranged axially on a common shaft.

This sliding piston will require comparatively large impulse energy for its movement, in spite of its often small diameter (5–10 mm.). The axial movement for the opening and closing of the ports tends to be long, because the pistons need a certain overlap to ensure acceptable sealing.

It is an object of the present invention to eliminate the above mentioned problems. The demand for better servo valves has increased through the present computerisation of industrial processes.

The invention relates to a pneumatic servo valve, which by means of electric signals can be brought to distribute compressed air to or from a double acting servo motor, whereby the compressed air is introduced into the valve through a hole in the middle of a cylinder, which is incorporated in the device and further from this through a circular groove in the centre of a piston in the cylinder and thereafter on through a drilling from the groove, radially towards the centre of a piston shaft having a central, lengthwise drilled channel, rigidly connected to and axially protruding from each side of the piston. The servo valve comprises channels for the connection of lines to said servo motor. The invention is characterized in that the distribution of pressure air is supplied by two double mushroom valves, having the point ends in the same direction, said valves being arranged coaxially in relationship to the piston shaft, so that these, towards the middle directed cones can be brought to seal against the centrally drilled channel in the piston shaft. Decompression seats are arranged coaxially with the valves and adjustably against their outer cones. The valves are loaded by one or two springs in such way that it is possible to adjust said decompression seats so that the piston can be displaced via the valves to a middle position, when it is not in any other way biased to move axially. The valves seal in this position with both cones against their respective valve seats, and the cylinder is so short in relation to the piston that the piston and the rigidly connected shaft can not move axially more than necessary for the valves to open fully and close for the distribution of pressure air. The space around the valves, between the ends of the shaft and the adjustable valve seats, communicate with channels for connection of lines to the servo motor, further the piston can be influenced to slide axially because both of its sides are connected to two independent flapper-nozzle systems. The flappers are forced by springs against the nozzles, and electromagnets are arranged for lifting of the flappers from the nozzles. The magnets being designed to receive electric signals from a computer located outside the servo valve.

Figure 2:
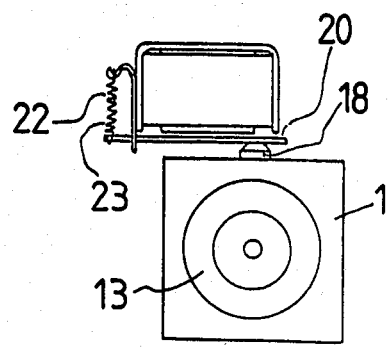
Figure 3:
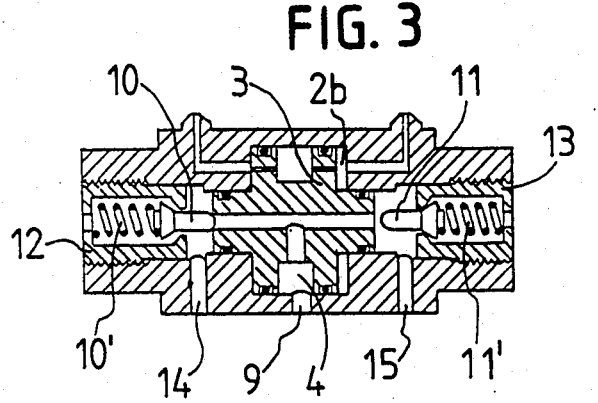
Figure 4:
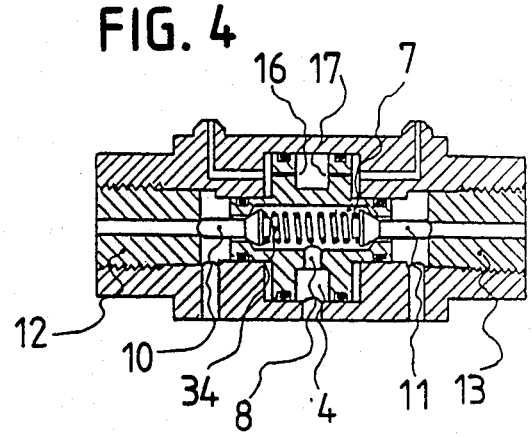

The invention will now be described with reference to the accompanying drawings, in which FIG. 1 show a servo valve according to the invention, which is connected to a schematically depicted control system, FIG. 2 is an end view of the servo valve, FIG. 3 shows the servo valve in one end position, and FIG. 4 shows an alternative arrangement of the mushroom valves.

The servo valve in FIG. 1 comprises a body 1 containing a cylinder, enclosing an axially slideable piston 3, which on its middle is surrounded by a circular groove 4. The piston has on each of its ends coaxially pointing dowels 5 and 6, which constitute a piston shaft, and are shown in the figure as being integral with the piston 3. The dowels can slide in drillings 5' and 6' which are coaxial with the cylinder 2. Small annular chambers 2a and 2b, respectively, are formed on each side of the piston 3. A coaxially drilled channel 7 extends through the piston 3 and the dowels 5 and 6, and is connected via a transverse drilling 8 with the circular groove 4, to which compressed air can be distributed through a feed opening 9 in the cylinder wall. Further the servo valve comprises two valves 10 and 11, coaxially located in line with the piston shaft and away from it. Each valve at each end comprises a mushroom valve (double mushroom valves) pointing in the same direction. The valves are in each direction located so that one of the cones seals the ends of the channel 7, and the other of the cones seals against decompression seats 12 and 13, which are included in the device. The decompression seats are axiallay adjustable. Springs 10', 11' according to FIG. 1, or only one spring 34 according to FIG. 4, act angist the valves.

By axial adjustment of the decompression seats the valves can keep the piston shaft, and with it the piston 3, in a middle position, when it is not biased by air pressure from its position. In this position all four valve cones seal against their respective seats.

Channels 14 and 15 are leading from the cavities formed around the shafts of the mushroom valves and between the ends of the piston shafts and the decompression seats. These channels can be connected to a shifting means.

There are drilled two very small channels, or restricting conduits 16 and 17, through the piston, in order to enable a flow of air pressure from the circular groove 4 in the piston 3 to the ring chambers 2a and 2b. Those channels lead from the outer sides of the ring chamber, or in other words the end faces of the cylinder, to decompression nozzles 18 and 19, which are held in closed position by means of flappers 20 and 21, also being influenced by springs 22 and 23 (see FIG. 2). Two electromagnets 24 and 25 are arranged to open the flappers.

PRINCIPLE OF OPERATION

Compressed air comes into the circular groove via the channel 9. The same pressure also acts in the channel 7, and the annular chambers 2a and 2b are filled through the conduits 16 and 17 together with the channels to the nozzles 18 and 19, which are sealed by the flappers 20 and 21. The system is now in balance with all valve seats, and both nozzles closed. The consumption of air is now equal to zero. From the figures, and the description it will be completely clear that any small movement of the piston 3 to the right or the left will influence both mushroom valves.

Let us assume that the servo valve is connected via pipes 26 and 27 to a shifting cylinder 28 with a driven piston 29. We also assume that the shifting cylinder is arranged to turn a throttle valve 30, the shaft of which carries an angle position indicator 31.

A microcomputer 32 and a central computer 33 are also schematically shown in the system. Assume that the central computer has received a signal, that the flow through the valve 30 is not correct. A fault signal goes to the microcomputer 32, which has a permanent signal from the position indicator 31 (actual value). The microcomputer compares this signal with the signal from the central computer (correct value), and calculates how much the valve 30 ought to be adjusted, and sends a signal to one of the electromagnets on account of this calculation. Assume that the magnet 24 gets electric current. The flapper 20 will then be lifted from the nozzle 18, and the pressure in the chamber 2a will drop because the opening area of the nozzle is several times larger than the area of the conduit 16. The pressure in the chamber 2b will then press the piston 3 to the left. The piston shaft 6 will then move off from the valve 11, and the shaft 5 will force the valve 10 to the left, affecting decompression. Pressurized air now flows through the channel 15, and the pipe 27 to the shifting cylinder 28, in which the piston 29 moves to the left, and air from the left side of the cylinder 28 escapes through the pipe 26, channel 14 and on through the decompression seat 12, which is opened to the atmosphere by the valve 10. See FIG. 3. When the microcomputer registers a correct angular value, it will interrupt the signal to the electromagnet 24, the flapper seals the nozzle 18, the pressure in the annular chamber 2a rises to equal the pressure in the chamber 2b, and the valve 10 forces the piston 3 via the spring back to its middle position, and the piston 29 is stopped. If the magnet 25 receives an electric current a corresponding shifting of the valve 30 will be effectuated in the opposite direction.

The flapper-principle means that it is possible with small forces, often a few grams, and very small movements, a few hundredths of a millimeter, to obtain large changes in pressure. The two independent flapper nozzle systems 16, 18, 20, and 17, 19, 21, respectively, together with the piston 3 works in the device according to the invention as a servo control of the servo valve. Therefore it is possible to control the servo valve without amplification of the low power signal from the microcomputer by means of small electromagnets. Several different embodiments of the invention are possible within the scope of the invention, for instance the valves and springs can be arranged according to FIG. 1 or FIG. 4 and the piston 3 can be replaced by two membranes comprising the annular chambers 2a, 2b and the circular groove 4. Cleaning of the small conduits 16, 17 can be obtained by locating in the cylinder a pin of approximatively the same length as the cylinder chamber 2, and of say 0.5 mm diameter for a 0.63 mm conduit. The pin will be stationary, while the piston moves axially, so the conduits will be automatically cleaned from any contaminations.

We claim:

1. A pneumatic servo valve, which by means of electric signals can be brought to distribute compressed air to or from a double acting servo motor, whereby the compressed air is introduced into the valve through a hole (9) in the middle of a cylinder (2), which is incorporated in the device and further from this through a circular groove (4) in the centre of a piston (3) in the cylinder and thereafter on through a drilling (8) from the groove, radially towards the centre of a piston shaft (5, 6) having a central, lengthwise drilled channel, rigidly connected to an axially protruding from each side of the piston, and that the servo valve comprises channels (14, 15) for the connection of lines to said servo motor, small conduits (16) and (17) are drilled from each end of the piston (3) towards the circular groove (4) in order to deliver pressure air to both ends of the cylinder (2) and further channels lead from each end of the cylinder (2) to two parallel, in the same direction arranged decompression nozzles (18, 19) and wherein the invention is characterized in that the distribution of pressure air to or from the servo motor is supplied by two double mushroom valves (10, 11) incorporated into the servo valve with cones in both ends pointing in the same direction, and that the valves are arranged coaxially with the piston shaft (5, 6), so that they can be brought to seal with cones pointing towards the middle against the channel (7) through the piston shaft, and that decompression seats (12, 13) are axially adjustable, coaxially with the valves and towards their outer decompression cones, and that the valves are loaded by one (34) or two springs (10', 11') in such way that the valves can be brought to displace the piston axially by means of axial adjustment of the decompression seats, and thereby the piston to a central position, wherein the piston in no other way is influenced for axial displacement, and that the valves in this position seals with both their cones against their respective valve seats so that there is no leakage of air from the device.

2. Servo valve according to claim 1, characterized in that the decompression nozzles (18) are closed by flappers (20, 21), biased by springs in order to control the air pressure on both sides of the piston (3), and thereby governing the position of the piston, wherein the pressure on both sides of the piston (3) can be controlled by lifting one or the other of the flappers from their respective nozzles by means of an electromagnet that is arranged for lifting of each flapper and is designed for receiving of electric signals from a microcomputer.

3. Servo valve according to claim 1, characterized in that an axial displacement of the piston shaft (5, 6) through different air pressures on both sides of the piston, from its central position will influence one of the double mushroom valves to lift from its seat against the piston shaft, allowing air pressure to flow to one side of the servo motor, and the other double mushroom valve lifts from its decompression seat, so that the other side of the servo motor is decompressed simultaneously with the servo motor moving to one direction, and that a displacement of the piston and the piston shaft in the other direction will influence the servo motor to move in the above described way in the opposite direction.

4. Servo valve according to claim 2 characterized in that the decompression nozzles (18) are closed by flappers (20, 21), biased by springs in order to control the air pressure on both sides of the piston (3), and thereby governing the position of the piston, wherein the pressure on both sides of the piston (3) can be controlled by lifting one or the other of the flappers from their respective nozzles by means of an electromagnet that is arranged for lifting of each flapper and is designed for receiving of electric signals from a microcomputer.

5. A pneumatic servo valve governing a double acting servo motor and comprising:
(A) a housing enclosing a cylinder having a central big-diameter portion and adjoining small-diameter portions,
(B) a central connection at said housing for the supply of compressed air and further connections located adjacent the ends of said housing for transferring compressed air to said servo motor,
(C) a piston axially slidable in the big-diameter portion of said cylinder mounted on piston rods slidable in said small diameter portions
(D) a central passage through said piston rods and piston, the ends of said passage forming first valve seats, an annular groove in the envelope surface of said piston, and a radial bore connecting said central channel with said annular groove,
(E) adjustable vent plugs closing the ends of said small-diameter cylinder portions, each plug having a second valve seat,
(F) two spring loaded mushroom valve bodies in said cylinder, each valve body having a head and a stem adapted to cooperate with one first and one second valve seat,
(G) restricting channels connecting said annular groove with said big-diameter cylinder portion to each side of said piston, and
(H) valve governed decompression nozzles connected to each of said sides of the big-diameter cylinder portion.

6. A servo valve according to claim 5 in which said decompression nozzles are normally closed by spring loaded flappers, each associated with an electromagnet for lifting the flapper off the nozzle.

7. A servo valve according to claim 5 in which the axial extension of said big-diameter cylinder portion is just sufficient to ensure a full opening of either of the valve bodies.

8. A servo valve according to claim 5 in which said valve bodies are mounted with their heads for cooperation with the second seats in said vent plugs, and with the ends of their stems cooperating with the first seats at the ends of said central channel.

9. A servo valve according to claim 5 in which said valve bodies are mounted within said channel with their heads cooperating with said first seats, and with the ends of their stems cooperating with the second seats at said vent plugs.

* * * * *